Nov. 6, 1923.
M. J. KERMER
EVAPORATOR
Filed Jan. 16, 1919
1,473,373
2 Sheets-Sheet 2
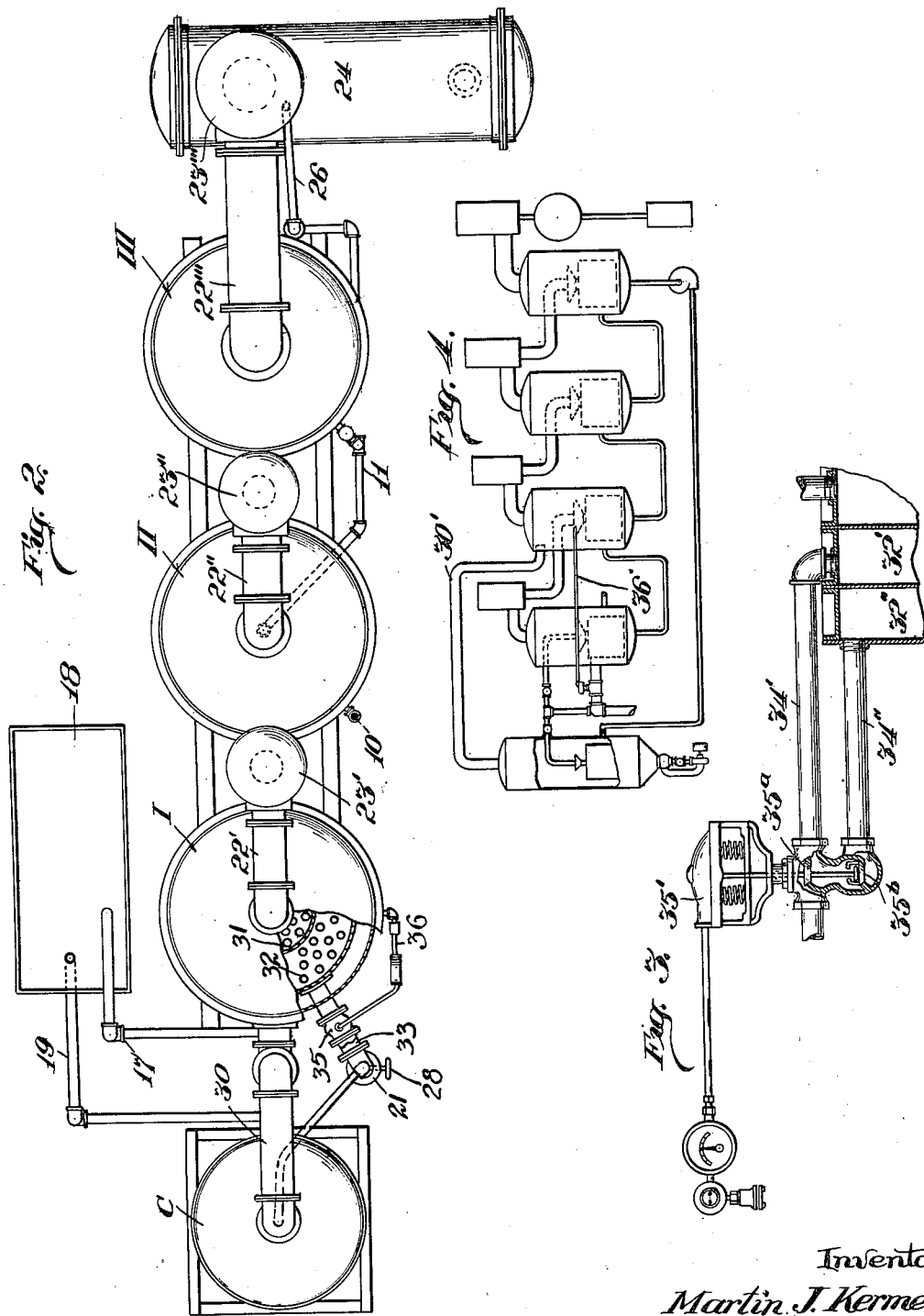
Inventor
Martin J. Kermer
By Rector Hibben Davis Macauley
Attorneys Patented Nov. 6, 1923.

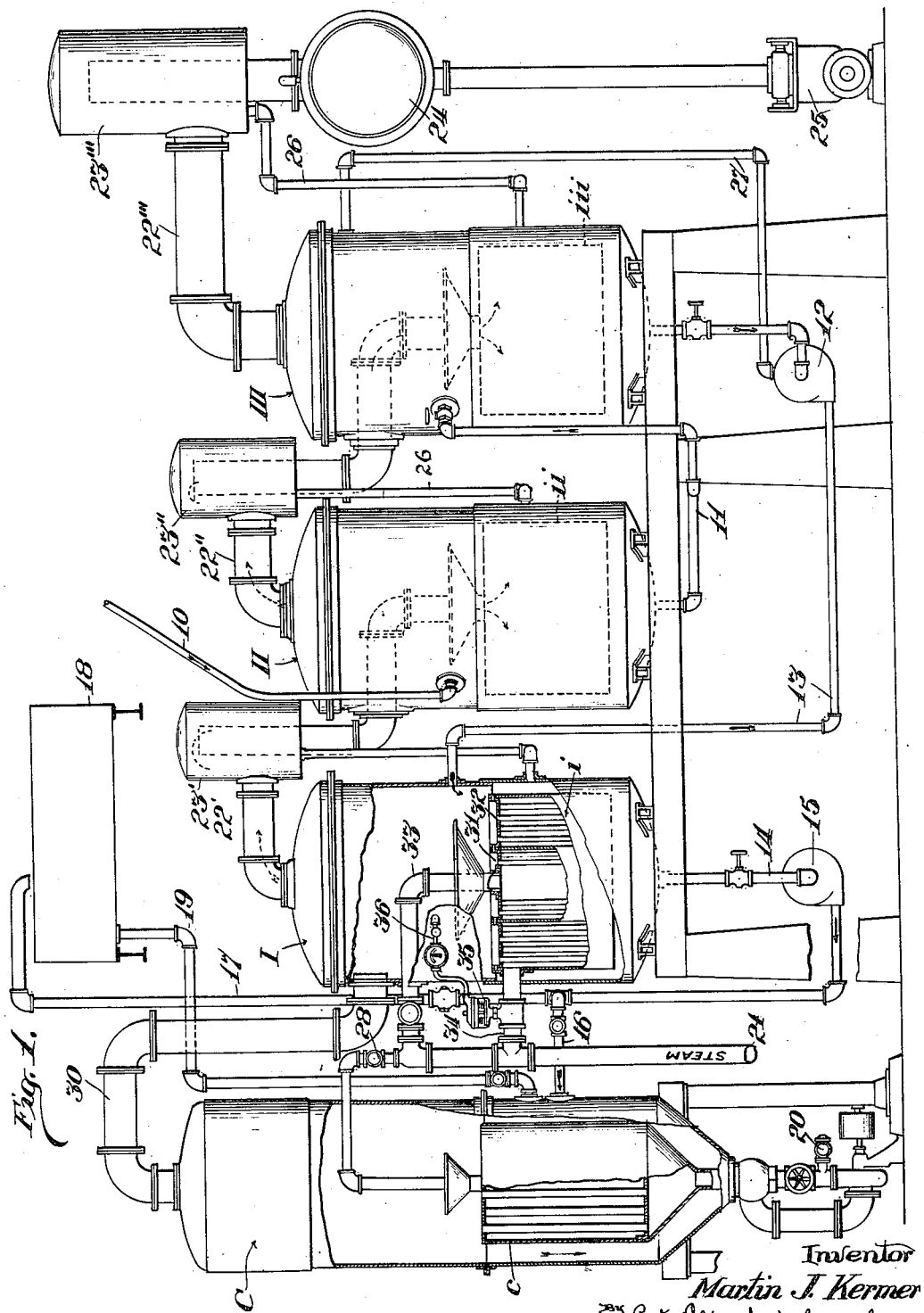

1,473,373

UNITED STATES PATENT OFFICE.

MARTIN J. KERMER, OF EVANSTON, ILLINOIS.

EVAPORATOR.

Application filed January 16, 1919. Serial No. 271,542.

*To all whom it may concern:*

Be it known that I, MARTIN J. KERMER, a citizen of the United States, residing at Evanston, in the county of Cook, and State of Illinois, have invented certain new and useful Improvements in Evaporators, of which the following is a specification.

My invention relates to evaporators and particularly, in most of its features, to evaporating systems in which the liquor is subjected to treatment in a concentrator after it has passed through a multiple-effect system which I will term the "primary" system. It is known practice to treat the liquor through a primary system,—say a triple-effect or quadruple-effect installation—and then to pass it to a concentrator which acts to further the degree of concentration; but in all such systems with which I am familiar the concentrator acts merely additively to, and in a sense independently of, the primary system and it in no way affects the operation of the primary system. In prior systems that include a concentrator there is usually a material loss of solid matter which is entrained with, and passes out with, the vapor from the concentrator, and to minimize this loss special catch-all equipment for the concentrator is requisite. Further, in some of such systems there is considerable steam-waste incident to the concentrator operation, for the vapor passes out of the concentrator at relatively high temperature.

My invention, in one sense, contemplates a novel inter-relation between evaporator units, such as a concentrator unit and a first-effect unit—which are severally heated by steam—and the equipment of the system for control of vapor pressure in one of said units by regulation of its steam supply. In another aspect my invention combines a concentrator with a primary evaporation system, making a unit of such primary system serve as a catch-all for the concentrator, so that entrainment-loss from the concentrator is impossible, all of the vapor from the concentrator being delivered into the primary system. In another sense my invention provides for operating a concentrator with multiple-effect steam-economy, causing its vapor to work in the primary evaporator system. And in a further sense my invention affords steam regulation of a first-effect unit (i. e., the unit receiving the line steam) of a primary evaporating system accordantly with the pressure-variation-tendencies that are manifested in one of the primary units and which may have wide range when varying quantities of vapor are delivered thereto from a concentrator.

In the embodiments of my invention which I have shown and will particularly describe, the liquor (for example a potassium and sodium brine) is subjected to treatment in a multiple-effect primary system one unit of which (called the "first" effect) is supplied with steam, and the vapor-outlet pipe of the concentrator, (which of course is also supplied with steam) delivers the vapor and entrained solids from the concentrator into the vapor space of one of the primary units precedent to the last or ultimate effect. In this way, such solids-losses as ordinarily occur where a concentrator is used are avoided, and the necessity for supplying a "catch-all" in connection with the concentrator is obviated, and further the vapor from the concentrator is utilized in the steam-space of a subsequent effect, influencing therefore, all effects subsequent to that into which it is introduced, so that the concentrator is itself worked with multiple-effect steam economy. Of course, in the ordinary operation of a concentrator the quantity of vapor delivered therefrom may vary widely, and so I provide, in the primary system, means for such compensatory regulation of steam supply to the first-effect as may maintain the intended working pressures of the several units at the points requisite for greatest economy. Preferably I accomplish this regulation of the steam supply to the appropriate unit by automatic means, and further, preferably, I effect the automatic steam control in a manner that is consistent with the maintenance of very active circulation in the first-effect unit, so that its efficacy will not be seriously decreased due to the regulating action.

From the following description it will be apparent that the features of my invention set forth and claimed are susceptible of embodiment in varied forms and arrangements of apparatus, and so it will be understood that, while for clarity of illustration I have diagrammatically represented evaporators, and a concentrator, of known commercial design, I do not intend to limit my invention to the selection of, and particular adaptation and arrangement of, the apparatus illustratively shown.

In the drawings, Fig. 1 is a side elevation with parts in section diagrammatically showing a triple-effect-and-concentrator system embodying my invention; Fig. 2 is a plan view of the same with parts in section; Fig. 3 is a detail of a regulating arrangement; and Fig. 4 is an outline sketch of a quadruple-effect system embodying my invention.

In Figs. 1 and 2, numerals I, II, and III represent the three evaporator units of a triple-effect primary system, wherein the liquor, introduced at inlet 10 follows the course indicated by solid arrows. Introduced into the second-effect (i. e., the unit whose steam-space receives vapor from the first effect), it flows thence through pipe 11 to the third-effect, and is forced by pump 12 through pipe 13 to the first-effect, whence it may be delivered through pipe 14 by pump 15 to the concentrator C. Pipe 14, beyond the pump 15 preferably has a valved branch 16 to the concentrator, and another valved branch 17 delivering to the storage tank 18 from which the liquor may be introduced into the concentrator by valved pipe 19. Of course the concentrated product may be drawn off from the concentrator, as at valve delivery pipe 20.

Steam is supplied to the heater $i$ of the first-effect by the steam pipe 21, the vapor from this unit passing, as indicated by dotted arrows, through pipe 22' and catch-all 23' to the heater $ii$ of the second-effect unit II; vapor from the second-effect passing similarly through pipe 22'' and catch-all 23'' to heater $iii$ of the third-effect, the vapor pipe 22''' of which is connected through catch-all 23''' with the condenser 24 and vacuum pump 25. Return pipes 26 from each catch-all to the liquor-space of its corresponding unit-shell are provided, and suitable provision is made as by equalizing pipe 27, running from the third-effect vapor space to pump 12, to equalize the pressure of the third effect vapor-space and the pump chamber. The pump, of course, is power driven by any means, not shown, and works under sub-atmospheric pressure in the specific installation illustrated.

It will be understood that in the diagrammatic illustration I have omitted the customary incidents of evaporator systems, such as gages, gas-reliefs, condensation drains, waste pipes, flushing connections, etc.

It will be understood that the sequence of the several effects is determined as to "first," "second," etc., by the steam-space pressure, but that with relation to liquor-progress the order may be varied, that shown being especially desirable where precipitation of solids is apt to take place if the final stages of evaporation occur at low temperatures, as is the fact, for example, with respect to sodium, potassium, and other salt solutions.

The concentrator C, I have illustrated as of a type now on the market, (though any concentrator may be used) this being constructed for pump-impelled circulation of the dense liquor. Its heater $c$ is supplied with live steam through the valved inlet 28 from pipe 21. The shell has vapor pipe connection 30 to deliver the vapor into the vapor-space of one of the multiple-effect units precedent to the ultimate effect—in this instance into the first-effect—so that the two elements C and I that receive steam in their heaters are interrelated for delivery of the vapor from the former to the vapor-space of the latter, so that the vapor from the concentrator C may be utilized with the vapor of unit I in the heating of the liquor in unit II. Thus, inevitably, the entrained material passing out of the concentrator is caught in the primary system, and the concentrator imposes no entrainment-losses on the operation of the system, and further the concentrator is arranged to operate with multiple-effect economy.

Of course the quantity of vapor passing from the concentrator to the evaporating unit I is subject to wide variation, decreasing as the liquor becomes more and more dense, and since this variant quantity of vapor is introduced directly into the vapor space of one of the primary units, it will be apparent that working vapor-pressures throughout the several primary effects would be disturbed, and efficiency would be apt to be reduced, if compensatory action in the primary system were not provided for. Therefore I provide regulating means, preferably automatic, for varying the action of the first-effect unit to maintain the desired pressure condition in the vapor-spaces of the several units notwithstanding the tendency to pressure-variation imposed by reason of the stated connection of the concentrator with said first-effect unit. In general I accomplish this by automatically regulating the quantity of steam admitted to the heater of the first-effect unit, and in this connection I preferably introduce a novel and special construction in the heater of said unit. Thus the heater $i$ is made in two sections 31 and 32, preferably concentric, the former having connection 33 with the steam pipe 21 for constant reception of a supply of steam, while the outer section 32 has a connection 34 with the steam pipe 21, controlled by an automatic, pressure-responsive valve mechanism 35, the pressure chamber of which has pipe-connection 36 to the vapor-space of the unit I.

The novel operation of the installation as shown will be as follows: Disregarding, for the moment, the concentrator and the special provisions made with respect thereto, the action of the triple-effect system would be as usual in an installation (not novel per se) where the liquor is introduced into the second-effect and passes successively through the third and first-effects; that is to say, the several primary units would maintain their appropriate relative pressures in their vapor-spaces as long as properly served with steam and raw liquor. Manifestly the installation might be so worked without calling the concentrator into action. In the specific installation shown, the raw liquor is first treated in the second effect, where the vapor space may be under, say, approximately a 13-inch vacuum and the steam basket works under, say approximately 8 pounds pressure. Thence the liquor passes to the third effect where the vapor-space vacuum may be, say 25 inches and and the steam basket is working under approximately a 13-inch vacuum. Thence the liquor is pumped, by pump 12, to the first effect where the pressure in the vapor space may be, say, 8 pounds and the steam basket may be served with steam at, say about 25 pounds pressure. Of course the foregoing is illustrative only, and not limitational, as the conditions may be widely varied, according to the temperature-requirement of the concentrator, the final vacuum attained, and the size and design of the heating surfaces.

When, however, the concentrator begins working on a charge of relatively dense liquor, vaporization therein is initially rapid, so that a large volume of vapor passes over through pipe 30. Pressure in the vapor space of unit I tends, therefore, greatly to increase, but the automatic operation of valve 35 cutting off or minimizing the steam supply to the section 32 of heater *i* so decreases the evaporation local to the unit I that the vapor pressure acting through pipe 22 to serve the second-effect heater will be only approximately normal. As concentration goes on in concentrator unit C and the vapor coming over to unit I decreases in volume, the consequent pressure-reduction-tendency in unit I results in automatic opening of the valved connection 35 to admit an adequate amount of steam to the outer section 32 of heater *i* of the first effect to maintain the pre-determined pressure. Of course, hand regulation of the steam may be substituted for or used additionally to the automatic regulation contemplated for the first-effect, although I regard the stated automaticity of action as desirable and valuable as a part of my invention.

While the construction of heater for reception of the variable steam supply may be changed, I regard that shown—namely, a cylindrical, flat-headed, liquor-tube drum, of sectional construction wherein one section is constantly under the full steam-pressure—as especially desirable, in that its physical construction is simple and more especially in that by providing a section thus heated to the full degree I can insure in the first-effect unit that forceful circulation and ebullition of the liquor which is usually so desirable. Furthermore, as shown in Fig. 3, this provision for full-heating in one section may be furthered if desired, and the external section 32 divided into plural sub-sections, as 32' and 32'', into which, successively, steam will be admitted as the automatic valved mechanism 35' responds to continuing tendency to pressure decrease, the valve mechanism—such as the tandem valves 35ª and 35ᵇ, diagrammatically illustrated—being of such character that they will be successively opened, and will close in reverse succession, so serving steam properly to the two pipes 34' and 34''.

It will be observed that not only is all of the solid matter saved which otherwise would escape through the concentrator-pipe 30, and this without the provision of a separate catch-all, but further the steam requirement for the satisfactory operation of the system is minimized, the concentrator, as well as the first-effect unit, working in connection with the second and third effects, to attain triple-effect economy.

It will be understood that the principles of my invention are not restricted to a triple-effect system. The important consideration is, of course, to be taken into account that a concentrator usually develops a vapor pressure above atmospheric, while a primary evaporator-system usually shows a sub-atmospheric pressure or "vacuum" in its penultimate effect. Hence the simplest practice, from the standpoint of evaporator-design, is to deliver the concentrator-vapor into a unit that should normally carry a pressure approximating that developed in the concentrator. In a quadruple-effect system, for instance, as shown in Fig. 4, the connection 30' may be made to deliver the concentrator-vapor into the second-effect rather than the first, and the regulation of steam-supply to the first-effect may be either from the second-effect-shell, by connection 36', or from the first-effect shell as shown in Fig. 1. Other changes may be made in arrangement, the suggested modification sufficing to indicate that the application of the invention claimed is not restricted to a single organization.

What I claim is:

1. In an evaporator system, the combination of a multiple-effect primary evaporating system wherein the vapor space of the first-effect unit is connected with the steam space of the second-effect unit and so on to the ultimate effect, which has a vapor outlet, and wherein the liquor spaces of the several effects are connected for liquor flow therethrough, a condenser receptively connected with the vapor space of the ultimate effect, a concentrator having its liquor space receptively connected with the liquor space of that unit which is last in liquor-flow sequence; means to supply steam at above atmospheric pressure to the steam space of the concentrator; means to supply steam at above atmospheric pressure to the steam space of the first-effect unit; and a vapor-delivering connection from the vapor space of the concentrator to the vapor space of a unit precedent to the ultimate effect unit, whereby said concentrator acts with multiple-effect steam-economy.

2. In an evaporator system, a multiple-effect primary evaporating system of more than two units, each said unit having a vapor space connected to the heating space of the next subsequent effect, and the ultimate effect having a vapor-delivery outlet; a concentrator; means for steam supply to the heating space of the first unit, means for steam supply to the heating space of the concentrator; liquor-flow connections between the liquor spaces of the evaporator units, a liquor flow connection from that unit which is last in liquor-flow sequence to the liquor space of the concentrator; and means for delivering the concentrator vapor from the vapor space of said concentrator into the vapor space of the ante-penultimate unit of the multiple-effect system.

3. In an evaporator system, the combination of more than two multiple-effect primary units, each having a vapor space connected to the heating space of the next subsequent unit, and the vapor space of the ultimate unit having a vapor outlet; means of steam supply to the heating space of the first unit; a concentrator having its vapor space permanently connected to deliver into the vapor space of a suitable one of said units, precedent to the ultimate effect unit, means to supply steam to the heating space of the concentrator, and means for regulating the steam supply to said first unit.

4. In an evaporator system, the combination of multiple-effect primary-units, each having a heating-space and a vapor space, the latter connected to the heating-space of the next subsequent unit, means of steam supply to the heating-space of the first unit, a concentrator having a vapor space connected to deliver to the vapor space of one of said units, and automatic means for regulating the steam supply to said first unit to maintain the pressures throughout the units substantially uniform under variations in pressure imposed by the concentrator.

5. The combination of a plurality of elements, each having a steam space, a liquor-and-vapor space, and an outlet pipe from the latter, one said element having its outlet pipe connected with the vapor space of another said element, means for introducing live steam into the steam space of the one said element, and automatically controlled means for introducing steam into the steam space of said other element to maintain substantially uniform pressure in its vapor space notwithstanding variation in the vapor-supply flowing thereto from the one said element.

6. The combination of an evaporator unit having a liquor-and-vapor space and a vapor outlet, a steam space and connection for supplying steam thereto, a second unit having a liquor-and-vapor space and a vapor outlet, its said liquor-and-vapor space being connected to the outlet of the first unit, the second said unit having a divided steam space with respective passages for different portions of the liquor, constantly-open connections for supplying steam to one of the divisions of said space, and means for varying the supply of steam to the other of the divisions of said space to maintain substantially constant the pressure in the vapor space.

7. The combination of an evaporator unit having a liquor-and-vapor space and a vapor outlet, a steam space, and connection for supplying steam thereto, a second unit having a liquor-and-vapor space and a vapor outlet, its said liquor-and-vapor space connected to the outlet of the first unit, the second said unit having a divided steam space with respective passages for different portions of the liquor, constantly-open connections for supplying steam to one of the divisions of said space, and automatic means for varying the supply of steam to the other of the divisions of said space to maintain substantially constant the pressure in the vapor space.

8. The combination of an evaporator unit having a liquor-and-vapor space and a vapor outlet, a steam space and connections for supplying steam thereto, a second unit having a liquor-and-vapor space and a vapor outlet from said liquor-and-vapor space, its said liquor-and-vapor space being connected to the outlet of the first unit, the second said unit having a cylindrical liquor-tube heater partitioned to divide its interior into two distinct steam spaces, normally open connections for supplying steam to one of said steam sections, steam supply means for the other section, and automatic means for varying the supply of steam to said other section to maintain substantially constant the pressure in the vapor space of said unit.

9. In a multiple-effect evaporator system, a plurality of elements having steam-spaces and means for separately supplying steam thereto at above atmospheric pressure, a unit having a heater connected to receive the vapor from said plural elements, and means for regulating the steam supply to one of said elements for maintaining substantially constant the vapor pressure supplied to the heater of said unit.

10. In a multiple-effect evaporator system, a first-effect unit having a heater and having variable steam supply connections thereto; other evaporator units having heaters each receptively connected to the vapor space of the preceding effect; a concentrator having a heater and steam supply connections thereto, and having its vapor space connected to the vapor space of one of the said evaporator units precedent to the ultimate effect; and a pressure responsive regulator controlled from the last mentioned evaporator unit and controlling the variable steam connections for the first-effect unit.

MARTIN J. KERMER.